(12) United States Patent
Watts, Jr.

(10) Patent No.: US 7,206,675 B1
(45) Date of Patent: Apr. 17, 2007

(54) RUNWAY APPROACH USING LOCALIZER ALONE

(76) Inventor: Chester B. Watts, Jr., 9697 Manteo Ct., Burke, VA (US) 22015

( * ) Notice: Subject to any disclaimer, the term of this patent is extended or adjusted under 35 U.S.C. 154(b) by 0 days.

(21) Appl. No.: 11/400,331

(22) Filed: Apr. 10, 2006

(51) Int. Cl.
*G01S 1/18* (2006.01)
*B64D 45/04* (2006.01)

(52) U.S. Cl. .................. 701/17; 340/947; 340/952
(58) Field of Classification Search .............. None
See application file for complete search history.

(56) References Cited

U.S. PATENT DOCUMENTS

| | | | | | |
|---|---|---|---|---|---|
| 3,757,338 | A | * | 9/1973 | Liebman | 342/411 |
| 3,805,588 | A | * | 4/1974 | Stone | 73/1.78 |
| 3,868,689 | A | * | 2/1975 | Liu et al. | 342/385 |
| 4,390,949 | A | * | 6/1983 | Beningfield et al. | 701/17 |
| 4,609,921 | A | * | 9/1986 | Flynn | 342/411 |

* cited by examiner

*Primary Examiner*—Michael J. Zanelli

(57) ABSTRACT

This invention provides an improvement in the present instrument approach procedure used at airports having an ILS localizer without an accompanying UHF glide-slope. The field strength of the localizer, as measured at the airplane, is used as a basis for producing a glide-slope deviation signal. The shape of the resulting path may be adjusted by changing the input/output characteristic of a localizer receiver.

2 Claims, 1 Drawing Sheet

RUNWAY APPROACH USING LOCALIZER ALONE

CROSS-REFERENCE TO RELATED APPLICATIONS

"Not applicable"

STATEMENT REGARDING FEDERALLY SPONSORED RESEARCH

"Not applicable"

REFERENCE TO A MICROFICHE APPENDIX

"Not applicable"

BACKGROUND OF THE INVENTION

This invention relates to improvements in runway approach procedures using the localizer alone. During the decade of the 1940's, when the ILS (Instrument Landing System) came into being, that instrument, called the "crosspointer," was designed to display, to the pilot, the deviation from a desired landing path, one needle for left-right (localizer), the other for up-down (glide-slope). ILS is well described by W. E. Jackson in 1959 IRE Transactions and reprinted recently by C. B. Watts, Jr. in INSTRUMENT LANDING SCRAPBOOK available at TRAFFORD.com, In a later decade, however, when there were some difficulties with installing a proper glide-slope at an airport, it was decided to authorize the use of localizer alone, leaving the one needle not operating (flagged). The desired up-down information was then obtained by using means, such as Altimeter, DME, or Global Positioning System as prescribed in the approach procedure for the particular airport. It is, however, hard to argue that it would not be good to have the glide-slope needle still operating.

BRIEF SUMMARY OF THE INVENTION

This invention relates to a modification of the aircraft ILS receiving equipment such that the field strength of the localizer can be used as the basis for glide-slope indication.

DETAILED DESCRIPTION OF THE INVENTION

It is well known that a given localizer, properly monitored on the ground, will radiate a constant field strength at any particular point in space, except for the mostly minor effects of reflections from moving objects in the vicinity. Over a flat earth, field strength tends to be proportional to altitude, and inversely proportional to the square of the distance from the station.

The method here proposed is to activate the glide-slope needle movement on the basis of the localizer field strength existing at the airplane. One concern would be regarding the pattern of the receiving antenna, especially in the vertical plane. It would not be good for the pitch attitude of the aircraft to have a major effect on the field strength measurement. A second concern is that an approach path that follows a line of constant field strength is much too steep far out, and too shallow close to the runway, as in line 8, FIG. 1. It is a purpose of this invention to provide a nearly straight path, as in line 10, FIG. 1. Properly done, a pilot could fly an approach as though a normal UHF glide-slope were present.

Figure 2:
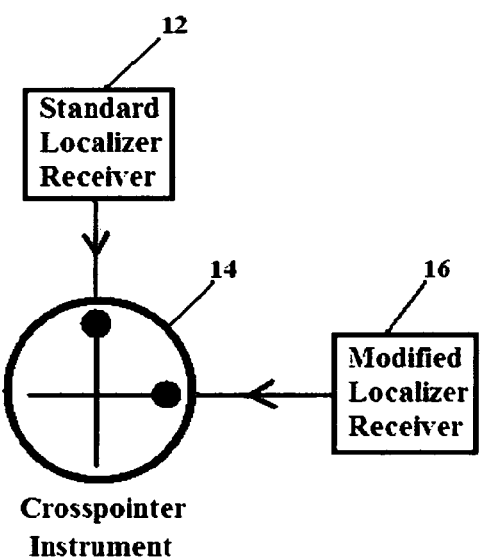
FIG. 2 represents one embodiment of the invention showing separate localizer receivers driving the pointers.

To accomplish this purpose, it is believed best to not modify the standard localizer receiver 12, FIG. 2, rather to provide, or modify, a separate receiver 16, FIG. 2, to have a dc output which is some function of the rf input signal. Also, rather than using the standard receiving antenna, it might be better to install a special antenna arranged to reduce the effect of pitch angle on the measurement. Depending on the aircraft, this could be, for example, a simple dipole mounted on the nose.

Step 1. modification of receiver 16. FIG. 2. would be to disable completely the automatic gain control (AGC). This has the effect of making available the parabolic path shape 8, FIG. 1, previously shown to be undesirable.

Figure 1:
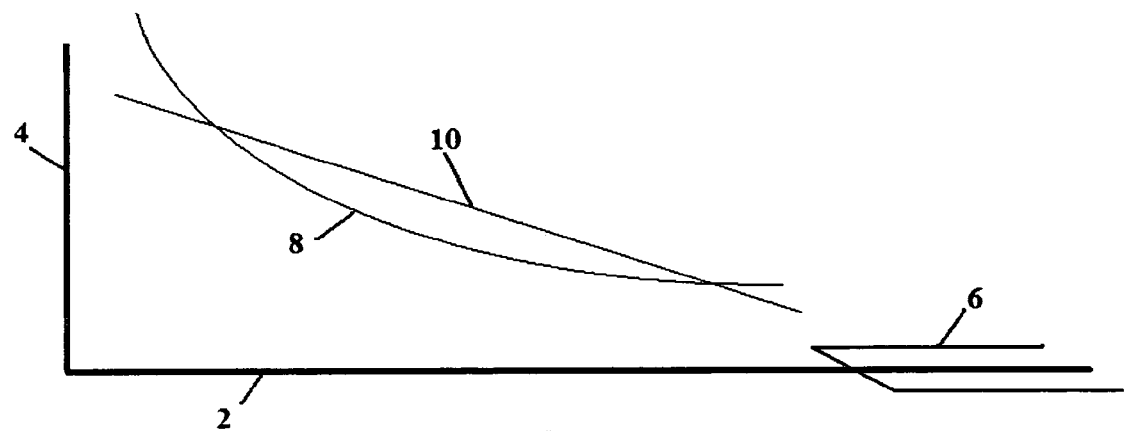
FIG. 1 represents a graph of two possible approach paths showing altitude versus distance from the runway.

Step 2. of the modification is more difficult, but should have the effect of producing the straight shape 10, FIG. 1. There are, at least, two ways to proceed: the first way would be to make, for reference, a recording of field strength versus time and space during a proper approach to the runway in good weather. The task then would be to design and provide a device to be used, during an actual approach, to subtract the received signal from the desired reference signal, and to apply the difference current, properly scaled, to the glide-slope needle.

A simpler way to achieve the desired straight line path might be to work with the AGC circuit of the receiver 16, FIG. 2. Rather than completely disabling the AGC circuit, one could modify, empirically, the shape of the AGC function, input vs. output until the desired shape is obtained.

I claim:

1. A method for providing ILS glide-slope using localizer field strength existing at an aircraft, comprising: providing a standard ILS localizer receiver for lateral guidance providing a second modified ILS localizer receiver for vertical guidance, with automatic gain control disabled to produce a DC output as a function of the received localizer signal field strength; determining a deviation between the DC output of said second receiver and a predetermined reference signal during approach to a runway; and, providing an indicator to display landing information wherein the determined deviation, properly scaled, is applied to a glide-slope needle.

2. The method of claim 1, wherein the predetermined reference signal is obtained by recording the field strength of a localizer signal versus time and space during an approach to the runway under favorable weather conditions.

* * * * *